United States Patent [19]

Ottaviani et al.

[11] Patent Number: 4,528,319

[45] Date of Patent: Jul. 9, 1985

[54] SAG CONTROL OF HIGH SOLID POLYURETHANE CLEARCOATS BY UREA THIXOTROPE/SILICA SYSTEMS

[75] Inventors: Robert A. Ottaviani, Washington; William T. Short, Southfield; Donald J. Hart, Sterling Heights, all of Mich.

[73] Assignee: General Motors Corporation, Detroit, Mich.

[21] Appl. No.: 633,055

[22] Filed: Jul. 20, 1984

[51] Int. Cl.$^3$ ............................................. C08K 3/36
[52] U.S. Cl. .................................. 524/540; 524/500; 524/871; 524/872; 524/875
[58] Field of Search ............... 524/500, 540, 871, 872, 524/875

[56] References Cited

U.S. PATENT DOCUMENTS 4,387,194 6/1983 Ottaviani et al. ................... 525/454

Primary Examiner—Lewis T. Jacobs
Attorney, Agent, or Firm—Randy W. Tung

[57] ABSTRACT

Novel, high solids urethane clearcoat compositions having improved flow characteristics by the incorporation of a flow control system composed of urea thixotrope/silica additives. The urea thixotrope constituent is prepared by reacting a polyether polyol with a stoichiometric excess of a saturated cyclic aliphatic polyisocyanate to produce isocyanate-terminated prepolymers. These prepolymers are then modified by reaction with an ethanolamine to form urea endcapped thixotropes which are compatible in structure with any urethane clearcoat system. A combination of one of these urea thixotropes and a finely divided transparent silica is used effectively to reduce sagging of high solids urethane clearcoat systems. In fact, the combination of the two components produces a synergistic effect which is greater than that expected from any one of the components in the flow control system.

3 Claims, 2 Drawing Figures

SAG CONTROL OF HIGH SOLID POLYURETHANE CLEARCOATS BY UREA THIXOTROPE/SILICA SYSTEMS

BACKGROUND OF THE INVENTION

This invention relates to high solids urethane clearcoat compositions, the flow characteristics of which are modified by the incorporation of a flow control system composed of urea thixotrope/silica additives.

Earlier work by two of the inventors hereof led to the development of novel, ultraviolet (U.V.) stable urethane binder compositions which are the subject matter of U.S. Pat. No. 4,387,194, assigned to General Motors Corporation, issued June 7, 1983. One such composition that was used in the current invention is a blend of polypropylene oxide polyethers and a hydroxy-terminated polyurethane derived from the polyethers, a U.V. stabilizing group that is incorporated into the polyurethane polymer backbone, and a melamine-formaldehyde cross-linking agent. These types of resins are generally the bases of high solids coating compositions which can form durable, high gloss finishes useful in painting automobile bodies.

For high solids coatings, the control of their flow behavior, i.e., the competing processes of sagging and leveling, is probably the most important and the most difficult aspect of their formulation. The problem is particularly acute when the paint is to be sprayed onto a vertically oriented surface. Coatings must be able to level in order to minimize surface irregularities or waviness and to develop the necessary appearance properties required of an automotive finish. During this time, various degrees of sagging will occur. Since those factors that govern sagging and leveling necessarily oppose each other, designing a system with complete leveling will result in severe sagging, whereas complete sag control results in no leveling. Consequently, a compromise must be made by balancing those factors that affect sagging and leveling. Our invention provides a method of controlling the flow behavior of a high solids urethane clearcoat system by the addition of a combination of a urethane-urea thixotrope/silica system.

When working with conventional low solids coatings, a paint-formulator relies almost exclusively on the careful blending of organic solvents to control the rate of solvent evaporation which, in turn, controls the coating's viscosity and rheological behavior from application through the final film formation or cure. These coatings can lose as much as 50 to 70% of their solvent content during the application and flash periods. High solids coatings, however, lose very little solvent during application and flash. Consequently, viscosity increase via solvent loss is negligible and is not a viable means of obtaining flow control.

High solids clearcoats are generally easy to apply to substrates by the spraying technique even though the nonvolatile solids (resin) content of such systems may be well above 50%. However, their viscosities and thixotropic properties are such that after application, they are prone to run and sag when applied to vertically oriented substrates. Improved flow control of these paint compositions is therefore critical to their greater utility in automotive applications where coatings may be sprayed onto vertically oriented body panels or parts with complex surface contours.

Desired rheological behavior for a sprayed paint coating dictates that it has a very low viscosity when subjected to high shear in the paint spraying process. However, once the paint has been applied to a substrate, the viscosity should increase enough so that the paint does not sag or drip but not so much that it fails to level.

Some flow control agents such as N,N-diethanolurea-terminated polyurethane have been used successfully to control sagging in high solids pigmented urethane paint. This practice is disclosed in a copending application U.S. Ser. No. 633,025, filed July 20, 1984. For instance, in urethane paint containing titanium dioxide pigment, the addition of this single thixotropic flow control agent dramatically improves the flow characteristics by reducing sag to as little as 12 % of the control coating which contained no thixotrope additives. However, when the same thixotropic flow control agent is used in high solid polyurethane clearcoats containing no pigment, the effect of the thixotrope on sagging is only marginal.

Accordingly, it is an object of this invention to provide a flow control system (i.e., where two chemical constituents acting in concert) which, when added to high solid polyurethane clearcoats, improves the flow characteristics of such clearcoats, particularly to promote ease of spraying and adequate leveling while inhibiting sagging and dripping.

It is another object of this invention to provide a high solids, non-pigmented urethane clearcoat formulation containing a flow control system such that the clearcoat is sprayable in a production environment, curable in a relatively short period of time at relatively low temperatures, and spreadable when wet without sagging or dripping.

BRIEF SUMMARY OF THE INVENTION

In accordance with a preferred embodiment of this invention, a combination of a polymeric urethane-urea thixotrope and a finely divided transparent silica material can be used effectively to control the flow of a high solids urethane clearcoat system. In fact, the combination of the two components produces a synergistic effect which is greater than that expected from any one of the components.

The synthesis of the polymeric urethane-urea thixotrope constituent can be accomplished in a two-step process. First, an isocyanate-terminated urethane prepolymer is prepared by reacting a polyether polyol with a stoichiometric excess of a saturated cylic aliphatic polyisocyanate. The polyether polyol used is preferably a mixture of polyoxypropylene oxide diols and triols in a ratio of diol:triol of about 1:1. Saturated cylic aliphatic polyisocyanate is preferred for its ultraviolet stability. A preferred polyisocyanate for the subject invention is methylene bis(4-cyclohexyl isocyanate).

In the second step of the synthesis, these isocyanate-terminated prepolymers are modified by reaction with an ethanolamine. The amine groups of the ethanolamine react with the isocyanate to form urea linkages while the hydroxy groups of the ethanol become terminal functional groups.

The second constituent of our flow control system is a CAB-O-SIL ® finely divided silica material. After the silica material is first mixed with a binder resin and a cross-linking agent in a suitable solvent, the urethane-urea thixotrope is added to the mixture to complete the clearcoat formulation. The total amount required of the flow control system in order to effect sag reduction is small, i.e., within the range of 7 to 15 weight percent of the clearcoat formulation. We have also found that within the flow control system, the effective ratio of thixotrope to silica could range anywhere between 1:3 to 4:1.

The pronounced flow control effect of our system is believed to be due to the interaction between the polar and hydrogen bond groups on the urethane-urea thixotropes with the fine particles of the transparent silica material. When the flow control system is added to a urethane clearcoat resin, the fine silica particles act like tie molecules by providing sites for attachment by secondary bonding associations of the clearcoat system. It is believed that this secondary bonding association is formed between the resin molecules, the thixotrope molecules, and the silica particles before the paint is cured. However, this secondary bonding is upset by the application of stress in the paint spraying process so that the viscosity under spray conditions is reduced exhibiting a shear-thinning behavior. However, once the uncured resin is applied to a substrate, secondary bonding re-occurs which helps to prevent sagging and dripping yet permitting enough flow to have good leveling properties.

Accordingly, the subject invention of a synergistic combination of urethane-urea thixotrope/silica can be effectively used as a flow control system in high solids urethane clearcoats which can be applied by spraying or spreading. Secondary bonding associations between the polar urea linkages in the urethane-urea thixotrope molecules and the filler particles prevent sagging and dripping before the clearcoats are cured. The inclusion of this urethane-urea thixotrope/silica flow control system in the uncured clearcoat does not interfere with any other desirable properties of the urethane clearcoat such as spraying and leveling.

DETAILED DESCRIPTION

The objects and advantages of our invention will be better understood in view of the detailed description which follows. Reference will be made to the figures in which.

Figure 1:
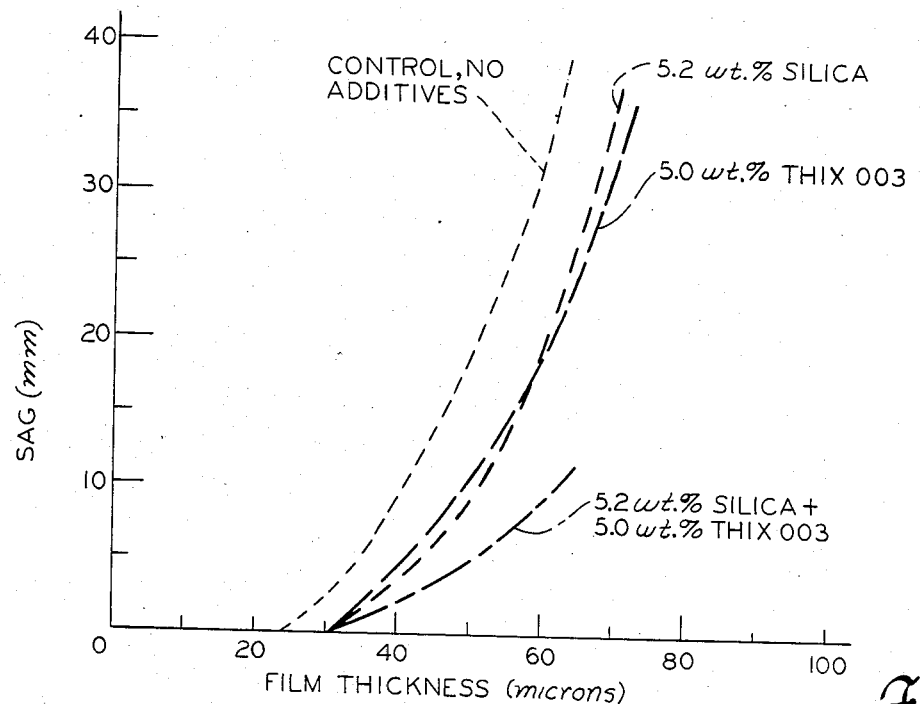
FIG. 1 is a plot of sag versus film thickness of a urethane clearcoat modified by a 5.2 wt% silica+5.0 wt% THIX 003 flow control system showing the effect on sagging of silica and THIX 003 each individually and the combined synergistic effect of the system.

We will first describe an example of a suitable clearcoat resin for our invention.

It is well known that saturated cyclic aliphatic polyisocyanates are more stable to ultraviolet radiation than unsaturated cyclic, straight chain or branched isocyanates. Therefore, the preferred polyisocyanates for the subject invention include such compositions as methylene-bis(4-cyclohexyl isocyanate), isophorone diisocyanate, hexamethylene diisocyanate, and 1,4-cyclohexane bis(methyl isocyanate). The first-mentioned compound is a preferred diisocyanate for the subject invention. It is a liquid sterioisometric mixture originally sold under the trade name of "Hylene W" by Dupont that is available as of the filing date hereof as Desmador-W ®, sold by Mobay. The material is sometimes generically referred to as $H_{12}MDI$. Analysis showed the material as received to be greater than about 99.2% pure. The isocyanate constituent should have a functionality of at least about 2 to promote a chemically cross-linked paint product.

The flexibilizing constituents of the subject urethane paints are preferably polyether polyols. These polyols have been found to provide urethane paints with such properties as high gloss, distinctness of image, impact resistance and chip resistance. The preferred polyethers are blends of polyoxypropylene diols and triols. Other polyether polyols such as those based on polyethylene oxide may also be used if they have suitable U.V. stability and workable viscosities. Table I lists a number of polyethers that were used.

TABLE I

SELECTED POLYPROPYLENE OXIDE POLYETHERS

| Material[a] | Functionality | % Solids | Viscosity @ 25° C. (Centipoise) | Hydroxyl Number | Molecular Weight |
|---|---|---|---|---|---|
| P-410 | 2 | 100 | 75 | 265 | 424 |
| P-1010 | 2 | 100 | 150 | 105 | 1050 |
| TP-440 | 3 | 100 | 600 | 398 | 423 |
| TP-1540 | 3 | 100 | 350 | 110 | 1530 |

[a]All polypropylene oxide polyethers were obtained from BASF Wyandotte under the trade name Pluracol ® resins.

Alkylolated amino resins are known cross-linking agents for industrial coatings. Outstanding properties such as hardness, high gloss, clarity and durability are provided by melamine curatives. Thus, melamine cross-linking agents are preferred for these U.V. stabilized urethane coatings. We have found partially methylolated melamine resins to be suitable. These are commercially available and may be formed by reacting less than six moles of formaldehyde with one mole of melamine in a methanol solution. The reaction yields a methylolated melamine by the addition of hydroxy methyl groups to the amine groups of the melamine resin. A preferred curing agent for this invention is trimethylol melamine dissolved in butanol that is sold by American Cyanamid under the trade designation Cymel ® 325. Generally, the melamine curing agent should be present in amounts adequate to react with substantially all of the free hydroxyl groups of a urethane binder resin to be cross-linked. About 40 grams of trimethylol melamine was used per equivalent of free hydroxy to cure the subject urethane binder resins. Fully methylolated (hexamethylated) melamine does not work.

In order to cure the subject paint resins in reasonable times at relatively low temperatures, it is necessary to catalyze, i.e., accelerate, the melamine cross-linking reaction. The preferred catalysts are weak acids soluble in organic solvents. A preferred catalyst is dimethyl pyrophosphoric acid (DMPA) sold by American Cyanamid as Cycat ® 296.9.

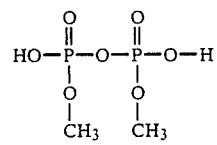

About 2 to 5 weight percent DMPA (excluding solvent weight) was used based on the weight of trimethylol melamine, about 3% being preferred.

Compatible solvents such as cellusolve acetate, methyl ethyl ketone (MEK), butyl alcohol, etc., are incorporated consistent with normal paint practices.

Likewise, fillers and other paint additives may be incorporated so long as they do not interfere with the invention. Table II shows a typical resin composition for the polyether-polyurethane resin and a clearcoat formulation used in this invention.

TABLE II

RESIN COMPOSITION AND CLEARCOAT FORMULATION FOR A HIGH SOLID URETHANE-MELAMINE COATING SYSTEM

A. Resin 2.0

| Material | Weight |
| --- | --- |
| Diol P410[a] | 304.19 g (1.435 equivalents) |
| Triol TP440[a] | 203.77 g (1.435 equivalents) |
| Diisocyanate $H_{12}MDI$[b] | 221.32 g (1.689 equivalents) |
| TMP-40H[c] | 40.0 g (0.254 equivalents) |
| Methyl Propyl Ketone | 135.75 g |

B. Clearcoat Formulation

| Material | Weight | % Nonvolatiles |
| --- | --- | --- |
| Resin 2.0 | 585.0 | 85 |
| Cymel ® 325[d] | 625.0 | 80 |
| Cycat ® 296-9[d] | 32.5 | 50 |
| Methyl Amyl Ketone | 150.0 | — |
| Methyl Propyl Ketone | 330.0 | — |
| Butyl Cellosolve | 110.0 | — |

[a]BASF Wyandotte Pluracol ® resins
[b]E. I. du Pont de Nemours & Co. - Hylene ® W
[c]TMP-40H = 2,2,6,6-tetramethyl-4-piperidinol
[d]American Cyanamid Co.

A key feature of this invention is the incorporation of small amounts (i.e., up to 15 weight percent) of a synergistic combination of a specially formulated urethane-urea polymer and a transparent filler of silica in high solid urethane clearcoats to control their flow behavior. The effect of synergism can be explained as follows. Assuming that a urethane clearcoat containing no flow control additives (the control) produces a sag length of 30 mm at a certain film thickness and that the addition of 5 wt% additive A alone reduces the sag length to 20 mm (i.e., $\frac{2}{3}$ of the original sag of 30 mm), while the addition of 5 wt% of additive B alone reduces the sag length to 10 mm (i.e., $\frac{1}{3}$ of the original sag of 30 mm) and further that there is no interaction between additive A and additive B, i.e., there is no synergistic effect, then the addition of both 5 wt% additive A and 5 wt% additive B should produce a reduction in sag length to approximately 7 mm (calculated by 30 mm $\times \frac{2}{3} \times \frac{1}{3}$). Therefore, an observation of sag length under 7 mm when the same amounts of additives A and B were added would indicate a synergism effect or an interaction between the additives A and B.

This flow control system of urea thixotrope/silica is specifically designed for compatibility with urethane clearcoats and for increasing viscosity by promoting secondary bonding associations during the clearcoat curing process. The theory supporting the flow control process provided in accordance with this invention is as follows. It is generally known that the viscosity behavior of coatings under high shear rate conditions such as spraying through a small orifice under pressure are dominated by the properties of the binder resins, fillers and solvents. Under the ultra low shear rate conditions following deposition and before cure, the flow properties are dominated by solvent evaporation and the formation of weak, easily disrupted secondary bonding associations. This secondary bonding association effect is particularly significant in high solids coatings which contain low levels of solvents. It is believed that in our clearcoats the polar urea linkages on the urethane-urea thixotrope contained in the flow control system are particularly adapted to form secondary bonding associations with the filler particles. It is hypothesized that these polar urea linkages also form secondary bonding associations with the melamine curing agent but to a lesser extent.

The constituent that is reacted with a portion of the isocyanate resin precursor to form these urea linkages is an amine which is mono-, di- or tri- substituted with hydroxy-terminated alkane groups where the maximum alkane chain length is less than about ten carbon atoms. The preferred reactant is diethanolamine, although ethanolamine and triethanolamine are also useful.

EXPERIMENTAL BACKGROUND

Unless otherwise stated, reagent grade chemicals were used as received. Acetone and 2-pentanone were dried over Linde ® 3A molecular sieves before use as solvents for free isocyanate. Methylene-bis-(4-cyclohexyl isocyanate) sold by Dupont under the trade name Hylene ® W was filtered through glass frit to remove any urea or polymeric contaminants formed upon storage.

Ethanolamine, diethanolamine and triethanol-amine were obtained from Aldrich Chemical Co. Puracol ® polyoxypropylene glycols were obtained from BASF Wyandotte, Inc., and the Cymel ® 325 melamine-formaldehyde resin was obtained from the Cyanamid Co.

Silica material used was CAB-O-SIL ® PTG grade silica supplied by Cabot Corporation. It has an average particle size of 0.014 microns, a surface area of $200 \pm 20$ m$^2$/g, a surface pH of between 3.6 to 4.3, and a bulk density of 2.3 lbs/ft$^3$.

The synthesis and composition of the base urethane-melamine clearcoats whose flow characteristics are improved in accordance with this invention are fully set out in U.S. Pat. No. 4,387,194 which is hereby incorporated by reference.

A standard procedure was followed for the synthesis of all urea-terminated urethane thixotropes. First, an isocyanate-terminated urethane resin was prepared by the reaction of a mixture of polyoxypropylene diols and triols (BASF Pluracol ® resins) with an excess of methylene-bis-(4-cyclohexyl isocyanate). These resins were further modified by reaction with variously substituted ethanolamines to introduce strong hydrogen bonding, terminal urethane and urea groups.

This two-step procedure permitted independent control of the structural characteristics of the urethane backbone such as branching, molecular weight, unreacted monomer content, etc., as well as the nature of terminal functional groups. The same procedure was also used to investigate the effect of urethane structure on the effectiveness of the flow control systems. A series of three isocyanate-terminated urethanes was synthesized (table III) and end-capped with N,N-diethanolamine. Aside from the molecular weight, the two most important variables were the branching coefficient and the residual diisocyanate content (table IV). Those resins with a branching coefficient of 0.22 were almost linear while those with the higher value of 0.80 were highly branched. The free diisocyanate content was important because it controlled the amount of monomeric diurea formed when the resins were capped with N,N-diethanolamine.

TABLE III

COMPOSITION OF POLYMERIC URETHANE-UREA THIXOTROPES

1. THIX 003

| | |
|---|---|
| Diol P1010 | 130.4 g (.246 equivalents) |
| Triol P440 | 10.0 g (.070 equivalents) |
| Diisocyanate $H_{12}MDI$ | 59.6 g (.455 equivalents) |
| Diethanolamine | 14.3 g (.136 equivalents) |
| Acetone | 25.0 g |

2. THIX 004

| | |
|---|---|
| Diol P1010 | 34.2 g (.065 equivalents) |
| Triol TP440 | 36.8 g (.259 equivalents) |
| Diisocyanate $H_{12}MDI$ | 129.7 g (.990 equivalents) |
| Diethanolamine | 69.7 g (.663 equivalents) |
| Acetone | 25.0 g |

3. THIX 005

| | |
|---|---|
| Diol P410 | 70.8 g (.322 equivalents) |
| Triol TP1540 | 49.0 g (.093 equivalents) |
| Diisocyanate $H_{12}MDI$ | 80.0 g (.610 equivalents) |
| Diethanolamine | 19.2 g (.183 equivalents) |
| Acetone | 25.0 |

TABLE IV

PROPERTIES OF POLYMERIC URETHANE-UREA THIXOTROPES

| Resin No. | DP(N) Chains | NCO:OH | Branching Coefficient | Equivalent Weight Diol | Triol | Diisocyanate | $Mn^a$ All | $Mn^b$ Chains | Wt % Residual Diisocyanate |
|---|---|---|---|---|---|---|---|---|---|
| THIX 003 | 10 | 1.43 | .22 | 525 | 142 | 131 | 3545 | 5252 | 2.7 |
| THIX 004 | 6 | 3.05 | .80 | 525 | 142 | 131 | 698 | 1949 | 28.9 |
| THIX 005 | 10 | 1.43 | .22 | 212 | 520 | 131 | 2638 | 3908 | 3.6 |

[a] Calculated number average molecular weight of all polymer species.
[b] Calculated number average molecular weight of excluding monomer.

At this point in the synthesis, the resins were treated in either of two ways. In one case, they were simply concentrated on a rotary evaporator until they had been reduced to a nonvolatile content of about 80 wt%. This produced viscous, white, waxy, and somewhat inhomogeneous samples. In the other case, the insoluble portion of the mixture was first removed by precipitation in acetone. When the acetone soluble fraction was concentrated, homogeneous resins with a clear to slightly amber color were obtained. The infrared spectrum of the acetone soluble resins had strong absorbances at 3300, 1727, 1635, and 1110 $cm^{-1}$ arising from the presence of hydroxyl, urethane, urea, and polyether groups. The acetone insoluble fraction also exhibited strong urea and hydroxyl peaks, but both the urethane (1725 $cm^{-1}$) and polyether (1100 $cm^{-1}$) absorbances were absent. Thus, the precipitate was virtually pure diisocyanate that had been endcapped with N,N-diethanolamine. This was also confirmed both by GPC analysis and by direct synthesis

EXAMPLE—SYNTHESIS OF A TYPICAL UREA-CAPPED POLYURETHANE THIXOTROPE (THIX 004)

A mixture of 17.1 g (33.5 meq) Pluracol® P1010 diol, 18.4 g (129 meq) Pluracol® TP440 triol, 64.8 g (494.7 meq) Hylene® W diisocyanate, and 50 g dry acetone were mixed together in an 8-oz bottle. Next, 1 drop (0.02 g) dibutyltin dilaurate catalyst was added, the sample was capped and shaken again briefly, then allowed to stand overnight.

A portion of the isocyanate-terminated resin so formed was added dropwise to a stoichiometric amount of N,N-diethanolamine. After standing for about 1 hour, this sample was concentrated on a rotary evaporator to give a white waxy solid with a nonvolatile content of 79 wt%.

The rest of the isocyanate-terminated resin was similarly added to a stoichiometric amount of the N,N-diethanolamine. In this case, however, the amine was diluted in a much greater volume of acetone, and the insoluble portion was removed by filtration. When the filtrate was concentrated on a rotary evaporator, a homogeneous, clear, viscous resin was obtained with a solids content of 73 wt%. The chief difference between the two resins was in the greatly reduced monomer content of the filtered sample.

The preferred silica compound was CAB-O-SIL® PTG silica supplied by Cabot Corporation. The method of dispersing the silica and the polymeric urethane-urea thixotrope into the resin system is described as follows: First, 33 g CAB-O-SIL® PTG grade silica and 354.5 g R 2.0 resin (85.8 wt% solids in methyl propyl ketone) is blended by hand and then placed on a Cayuga high speed mixer for 25 minutes at 3000 rpm to Hegman reading of 5.5. A suitable amount of urethane-urea thixotrope is then added by mechanical stirrer after silica containing R 2.0 resin is blended with Cymel® 325.

A wide range of ratios between 1:3 to 4:1 of thixotrope to silica in our flow control system was used in our experiments. We have found that only a small amount of the flow control system was necessary to effect sag reduction in our clearcoat formulation, i.e., within the range of 7 to 15 weight percent.

The clearcoats are then sprayed onto a series of 4×12 inch panels and maintained in a vertical position during the complete processing cycle—application, flash, and bake.

Figure 2:
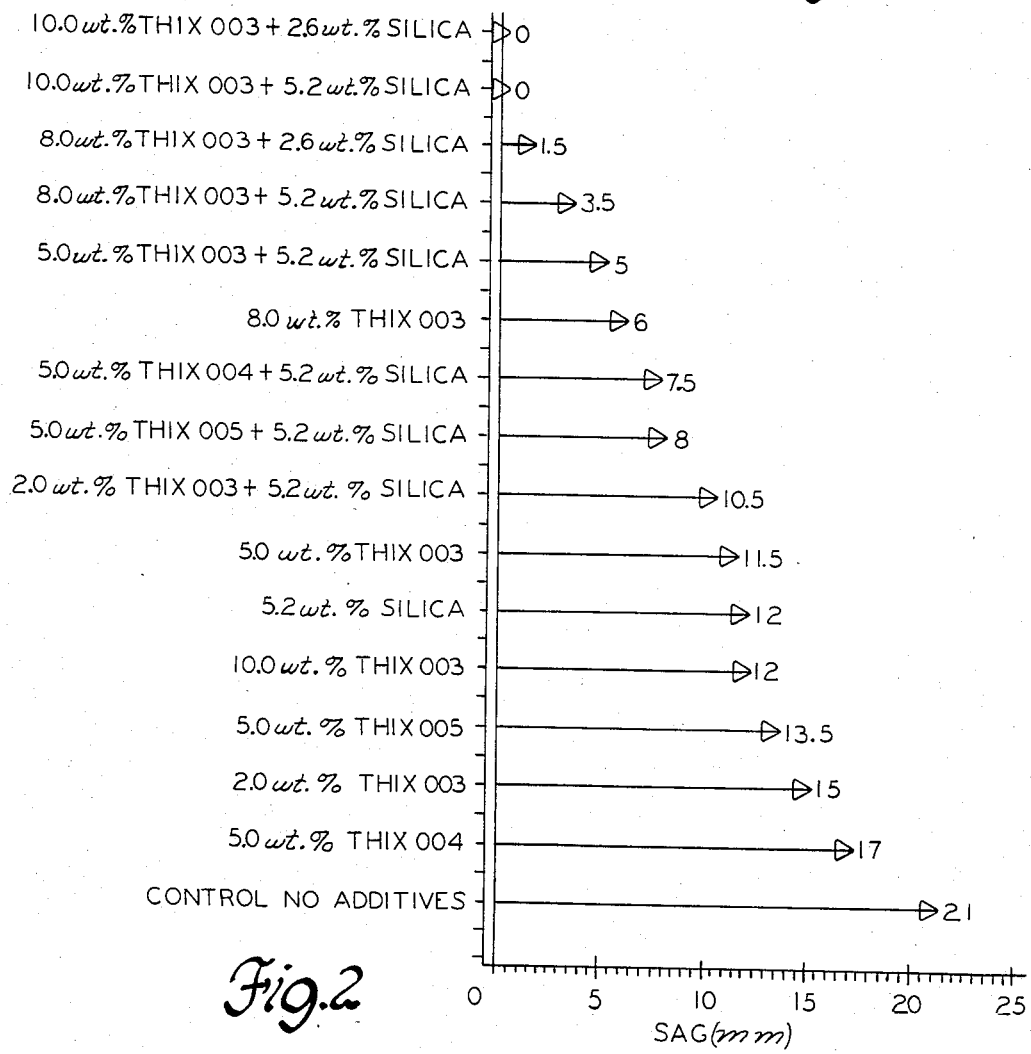
FIG. 2 is a plot showing the effect of each individual component and the combined synergistic effect of various flow control systems on controlling sag. The data are normalized to a standard film thickness of 50 microns for easier comparison.

FIG. 1 shows a typical synergistic effect of the silica-/urethane-urea thixotrope system on the sag resistance of the clearcoat system used in this invention. At a normalized film thickness of 50 microns (2.0 mils), FIG. 2 shows that the control system without any flow control additives has a flow line measuring 21 mm. The addition of 5.2 wt% of total resin solids (TRS) of the silica material alone reduces this flow length to 12 mm. At the 10.0 wt% level (TRS), the use of only the polymeric urethane-urea thixotrope (THIX 003) reduces this flow length to 12 mm. The addition of both of these materials, however, at the above weight levels virtually eliminated sagging, resulting in a reduction of this flow line to well under 1 mm. Assuming there was no synergistic effect, then the addition of both additives should have produced only a reduction of flow line to 7 mm. The same synergistic effect is also observed in systems of 5 wt% THIX 004+5.2 wt% silica and 5 wt% THIX 003+5.2 wt% silica.

The thixotrope material designated THIX 003 was found to yield the best results when combined with silica. When the THIX 003 thixotrope was used at the 10.0% wt level in combination with the PTG silica material at levels as low as 2.6% wt, no measurable sag was obtained. As seen in FIG. 2, 10.0% wt of THIX 003 alone yields 12 mm sag length at the normalized film thickness of 50 microns.

In contrast to other transparent filler systems that were examined, the silica in combination with the polymeric urethane-urea thixotropes yielded stable coating systems. To date, a pot life of 5.5 months has been observed with no noticeable indication of impending instability. In addition, this synergistic combination of silica and polymeric urethane-urea thixotrope has no measurable effect on the initial appearance properties of the film.

The data presented in FIGS. 1 and 2 have fully demonstrated that the addition of small amounts of novel combinations of diethanolamine terminated urethane-urea resins and a transparent filler of silica to the melamine-cured urethane clearcoats provided greatly reduced sagging. This reduction is achieved without compromising other desirable coating properties.

The addition of the thixotrope resins is especially effective because of the synergistic action in combination with the silica filler. This is important because it allows one to achieve a given performance level (sag control) with considerably reduced silica concentration. Reducing the amount of silica significantly lowers the viscosity of the clearcoat and indirectly increases the allowable level of spray solids.

While our invention has been described in terms of a preferred embodiment thereof, it is to be appreciated that those skilled in the art will readily apply these teachings to other possible variations of the invention. For instance, any other transparent inorganic filler of fine particle size may also work in our flow control system.

The embodiments of the invention in which an exclusive property or privilege is claimed are defined as follows:

1. A sprayable high solids urethane clearcoat composition comprising a urethane binder resin, a partially methylolated melamine cross-linking agent, and a flow control system consisting of a urethane-urea polymer and silica particles, said flow control system being added in an amount between 7 to 15 weight percent of said composition to improve the flow properties of the urethane clearcoat, said urethane-urea polymer constituent being a reaction product of an isocyanate-terminated polyether urethane prepolymer and an ethanolamine selected from the group consisting of monoethanolamine, diethanolamine, and triethanolamine.

2. A sprayable polyurethane clearcoat composition containing at least about 50 weight percent nonvolatile constituents comprising a urethane binder resin being a reaction product of an aliphatic poly-isocyanate and a stoichiometric excess with respect to the polyisocyanate of polyether polyols, a partially methylolated melamine cross-linking agent and an amount between 7 to 15 weight percent of said composition of a flow control system consisting of a combination of a urethane-urea polymer and fine particle size silica, said flow control system reducing sagging of the urethane clearcoat when applied to vertically oriented substrates, said urethane-urea polymer being a reaction product of an isocyanate-terminated prepolymer prepared by the reaction of one or more polyether polyols with an excess of a diisocyanate and an ethanolamine selected from the group consisting of monoethanolamine, diethanolamine, and triethanolamine.

3. A sprayable polyurethane clearcoat composition containing at least about 50 weight percent nonvolatile constituents which composition produces a durable surface finish when applied to and cured over a suitable substrate, said composition comprising a urethane binder resin being a reaction product of an aliphatic polyisocyanate and a stoichiometric excess with respect to the polyisocyanate of polyether polyols, a partially methylolated melamine cross-linking agent and a flow control system consisting of a combination of a urethane-urea polymer and fine particle size silica in a ratio between 1:3 to 4:1, said flow control system when added in an amount between 7 to 15 weight percent of said clearcoat composition reducing sagging of said clearcoat when applied to vertically oriented substrates without adversely affecting the viscosity and gloss properties, said urethane-urea polymer being a reaction product of an isocyanate-terminated prepolymer prepared by the reaction of one or more polyether polyols with an excess of a diisocyanate and an ethanolamine selected from the group consisting of monoethanolamine, diethanolamine, and triethanolamine.

* * * * *